United States Patent
Vollmar

(10) Patent No.: US 6,474,187 B1
(45) Date of Patent: Nov. 5, 2002

(54) DEVICE FOR CHANGING THE GEARS OF AN AUTOMATIC TRANSMISSION

(75) Inventor: Reinhard Vollmar, Ravensburg (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/762,757

(22) PCT Filed: Jun. 7, 2000

(86) PCT No.: PCT/DE00/01819

§ 371 (c)(1),
(2), (4) Date: Feb. 9, 2001

(87) PCT Pub. No.: WO00/77425

PCT Pub. Date: Dec. 21, 2000

(30) Foreign Application Priority Data

Jun. 12, 1999 (DE) .......................... 199 26 823

(51) Int. Cl.[7] ............................... F16H 59/00
(52) U.S. Cl. ...................... 74/336 R; 74/552
(58) Field of Search .............. 74/473.12, 335, 74/336 R, 552, 501.6, 502.2

(56) References Cited

U.S. PATENT DOCUMENTS

| 5,335,743 A | * | 8/1994 | Gillbrand et al. | 180/178 |
|---|---|---|---|---|
| 5,365,803 A | * | 11/1994 | Kelley et al. | 74/484 R |
| 5,520,066 A | * | 5/1996 | Tueri | 74/484 R |
| 5,855,144 A | * | 1/1999 | Parada | 74/552 |
| 6,033,338 A | * | 3/2000 | Jackson et al. | 477/44 |
| 6,053,066 A | * | 4/2000 | Ishii et al. | 74/473.18 |
| 6,327,932 B1 | * | 12/2001 | Onodera et al. | 74/552 |

FOREIGN PATENT DOCUMENTS

| DE | 4005588 A1 | * | 2/1990 |
| DE | 4311852 A1 | * | 4/1993 |
| DE | 4324788 C2 | * | 7/1993 |
| DE | 4423744 A1 | * | 7/1994 |
| DE | 19539847 C1 | * | 10/1995 |
| DE | 19739626 A1 | * | 9/1997 |
| EP | 0844128 A1 | * | 5/1998 |
| EP | 0895003 A1 | * | 2/1999 |

* cited by examiner

*Primary Examiner*—Dirk Wright
(74) *Attorney, Agent, or Firm*—McGlew and Tuttle, P.C.

(57) ABSTRACT

The device for shifting an automatic transmission for motor vehicles has a selector lever, which makes possible an automatic uplifting and downshifting of the transmission in a first position as well as an additional arrangement on the steering wheel for manual downshifting or upshifting; this additional arrangement 2 is integrated within the steering wheel rim 1.

18 Claims, 2 Drawing Sheets

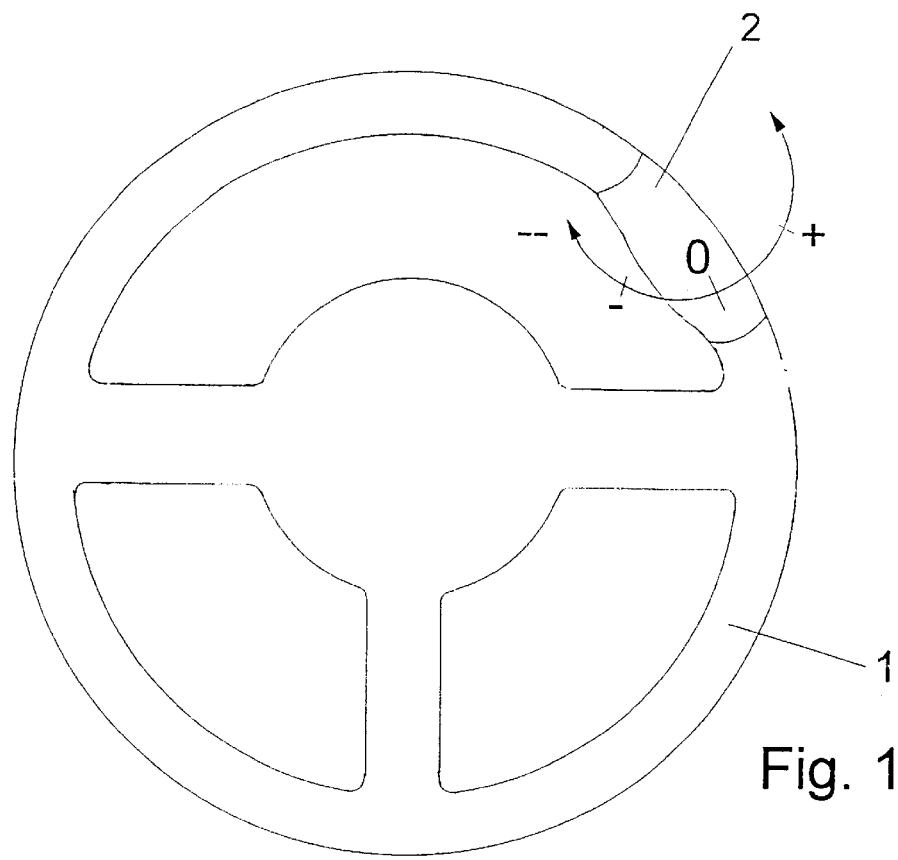
Fig. 1
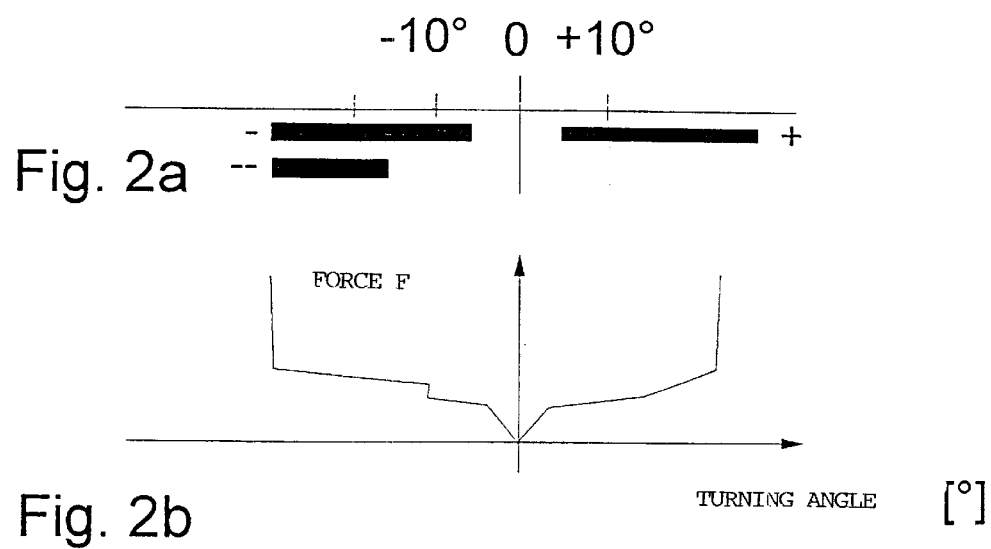
Fig. 2a
Fig. 2b

DEVICE FOR CHANGING THE GEARS OF AN AUTOMATIC TRANSMISSION

FIELD OF THE INVENTION

The present invention pertains to a device for shifting an automatic transmission for motor vehicles, which has a selector lever, which makes possible an automatic upshifting and downing of the transmission in a first position as a function of the speed of the vehicle or the speed of rotation of the engine.

BACKGROUND OF THE INVENTION

Motor vehicles with an automatic transmission usually have a display field arranged in the dashboard for displaying the position of the selector lever arranged on the cardan tunnel. This has the advantage that the driver can ascertain the position of the selector lever by looking at the display and observe the traffic at the same time. What is still disadvantageous is that the driver looks at the selector lever block or the program selector during the operation of the selector lever or a program selector in order to shift over into the desired position of the selector lever or the program selector.

A shifting device for an automatic transmission, which has a selector lever guided in at least one shift gate, has been known from DE 40 05 588 A. Different gears can be preselected with this in both the automatic shift gate and a manual shift gate. The manual shifting in this shift gate has upshifting and downshifting positions which start from the middle position and can be shifted by a tipping movement. The automatic shifting is performed in the shift gate that has the gearshift positions such as the parking position, the reverse position and the forward position, which is performed by correspondingly displacing the selector lever in this shift gate. A steering column switch is used to shift the gears. A selector lever, which is directly associated with the shift gates and can be actuated in the manner of a rocker type switch and which shifts the gears manually by moving into the upshift and downshift position, is provided in one exemplary embodiment.

DE 43 24 788 C describes a motor vehicle with a power shift gear, which can be shifted automatically optionally by means of a selector lever associated with the shift gates or also manually, and the manual shifting can additionally also be performed by means of an actuating means arranged on the steering wheel instead of by means of the selector lever in the area of the shift gates when the selector lever is in the manual shift gate. This actuating means comprises a shifting rocker, which can be actuated with a finger and is embedded in at least one spoke of the steering wheel by means of a housing for manually upshifting and downshifting the transmission, wherein the shifting rocker with grip surfaces directed one after another in the longitudinal direction of the vehicle, with a pivot axis arranged at right angles to the steering wheel and with a shifting path in opposite directions between coaxially arranged push switches is pivotable and wherein the outer surface of the shifting rocker has a surface extending flush with the outer contour of the padding of the spoke.

Although manual shifting of an automatic transmission is made herewith possible, the driver must remove one of his fingers from the steering wheel to actuate the shifting rocker and find the shifting rocker in the spoke of the steering wheel in a searching movement. Finally, an actuating means for manually triggering the shifting operation of a motor vehicle transmission, especially the stepped shifting operation of a continuously adjustable transmission, has been known from DE 43 11 852 A, and this actuating means is arranged in the middle area of the steering wheel especially in the area of the baffle plate present there. The actuating means may have at least one button for triggering a gear shift or even two buttons, which are arranged directly next to one another or at spaced locations from one another, wherein one of the buttons is used for upshifting and the other button for downshifting. At least one finger, usually the thumb, must be removed from the steering wheel rim to actuate one of the buttons in this case as well.

The drawback of all shifting arrangements in the steering wheel with switches arranged one on top of another is the possibility of operating error on the part of the driver. In the case of greater steering angles, the driver must grip around the steering wheel. If the switch for upshifting is, e.g., at the top relative to the switch for downshifting in the neutral position of the steering wheel, this shifting arrangement is mirrored horizontally at half or one and a half rotation of the steering wheel and the switch for the upshifting is now the lower switch.

SUMMARY AND OBJECTS OF THE INVENTION

The object of the present invention is to provide a device for shifting an automatic transmission, with which manual shifting of the transmission can be carried out from the steering wheel in an especially favorable manner m terms of grip and safety against operating error and which has a simple design and can be manufactured at low cost.

According to the invention, a device for shifting an automatic transmission for motor vehicles is provided with a selector lever. The selector lever makes possible an automatic upshifting and downshifting of the transmission as a function of the speed of the vehicle and the speed of rotation of the engine in a first position and has an additional arrangement on the steering wheel, which makes possible a manual downshifting and upshifting. The additional arrangement is integrated within the steering wheel rim.

The additional arrangement may be a segment of the steering wheel rim. This segment is mounted rotatably around the longitudinal axis of the rim and is designed as a button. The button may have two locked positions for the downshifting. The first locked position brings about a downshifting into the next lower gear and the second locked position brings about a downshifting into the lowest permissible gear at maximum speed.

The additional arrangement may be a segment of the steering wheel rim which is elastically deformable around the longitudinal axis of the rim. A switch that can be actuated by a rotating force is associated with the segment. The switch may be a membrane switch. The switch may be a pressure sensor switch.

Consequently, provisions are made according to the present invention for the additional arrangement for manual downshifting and upshifting in certain driving situations to be integrated in the steering wheel rim, preferably in the area that is usually grasped by one of the hands of the driver.

The segment of the steering wheel rim, which is mounted rotatably around its longitudinal axis or is elastically deformable, requires the application of only a weak force to make possible the manual downshifting or upshifting, and all fingers of the driver may remain on the steering wheel rim in the usual position.

Due to the axial symmetry of the shifting means according to the present invention relative to the steering wheel rim, the direction of actuation for shiftings of the same type does not change for the driver at all turning angles of the steering wheel. The safety against operating errors which is achieved as a result is an essential contribution to driving safety.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a top view of a steering wheel designed according to the present invention for the motor vehicle;

FIG. 2a is a contact diagram for the button;

FIG. 2b is a graphic representation of the force to be applied during the turning of the steering wheel segment;

DESCRIPTION OF THE PREFERRED EMBODIMENT

Figure 3:
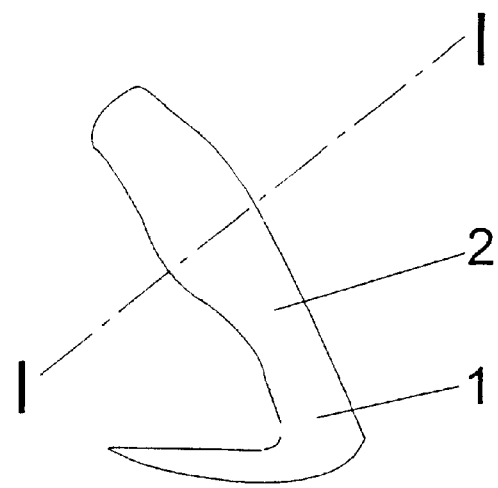
FIG. 3 is a partial view of a steering wheel for a second exemplary embodiment.

Referring to the drawings in particular, FIG. 1 shows a top view of a steering wheel, which comprises in the conventional manner a steering wheel rim 1, which is connected via three spokes in this exemplary embodiment to a steering wheel hub, on which a collapsible pot is arranged, e.g., for accommodating an air bag. According to the present invention, the steering wheel rim 1 has a segment 2, which is integrated within the steering wheel rim 1, i.e., has the same diameter, but is rotatable around the longitudinal axis. This rotatability is indicated by the bent double arrow in FIG. 1. This segment 2 is advantageously designed as a button, so that shifting operations of the automatic transmission can be performed manually during the rotation of the segment 2.

In a preferred embodiment, the button of the steering wheel segment 2 has two locked positions for downshifting operations, where only simple downshifting into the next lower gear are carried out in the first locked position, while downshifting is performed into the lowest permissible gear in the second locked position at maximum speed.

A corresponding contact diagram is shown in FIG. 2a. The neutral position of the segment 2 is designated by 0, just as in FIG. 1. A slight turning of the segment 2 in FIG. 1 to the left (−) leads into the first locked position, i.e., to the contacting of a corresponding contact (shown top left in FIG. 2a); further turning leads to the contacting of a second contact (—) and thus to the second locked position, in which the downshifting is made possible at maximum speed into the lowest permissible gear.

FIG. 2b shows the force F necessary for these shifting operations, which is shown on the ordinate, while the turning angle of the segment 2 in degrees is shown on the abscissa.

The manual shifting operation is activated by turning the segment 2 when either a switch is closed, e.g., the selector lever (not shown) is located on the shifting block of the cardan shaft in the manual shift gate or when the button contained in the segment 2 is actuated. The display in the dashboard is also switched with the actuation of the button and the requested shifting is performed.

This manual shifting operation is abandoned when the manual switch is again set to automatic; if the manual shifting operation was requested in the automatic mode, the manual operation can take place by actuating the segment 2 in the opposite direction (+in FIG. 2) beyond a certain time, e.g., 1 sec, and the contacting indicated in the top right part of FIG. 2a with a plus sign now takes place.

Figure 4:
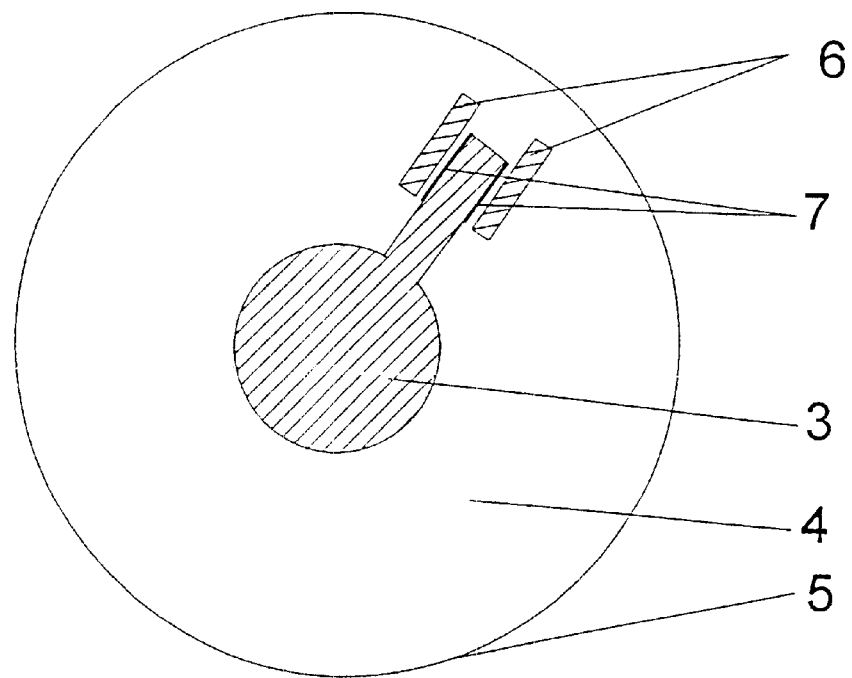
FIG. 4 is a sectional view taken along line I—I in FIG. 3.

An even greater simplification and thus a favorable series production are made possible in the second exemplary embodiment shown in FIGS. 3 and 4. The segment 2 is no longer integrated here rotatably around its longitudinal axis in the steering wheel rim 1, but is designed as an elastically deformable segment.

As can be recognized from the cross section along line I—I in FIG. 3, which is shown in FIG. 4, a corresponding switch, e.g., a membrane switch or a pressure sensor switch, with which the desired manual shifting is initiated, is integrated in the segment 2 of the steering wheel rim 1. The steering wheel comprises in the usual manner a steering wheel core 3 made, e.g., of metal, which is surrounded by a foam 4, which is covered by a cover, e.g., a leather cover 5. A membrane switch designated by 7 or a pressure sensor switch is rigidly connected to the steering wheel core 3, and plates 6, made, e.g., of plastic, are arranged on both sides. Prior-art membrane switches have an electric internal resistance proportional to the actuating force, e.g., a resistance range from 2 M$\Omega$ at a pressing force of 0.1 N to 1 K$\Omega$ at 100 N. The desired point at which the corresponding downshifting shall be triggered by contacting the membrane switch or the pressure sensor switch could thus be coordinated accurately in the corresponding electronic unit for the automatic transmission. Only one pressure sensor switch is needed in this exemplary embodiment for the simple downshifting into the next lower gear and for the downshifting at maximum speed into the lowest permissible gear.

While specific embodiments of the invention have been shown and described in detail to illustrate the application of the principles of the invention, it will be understood that the invention may be embodied otherwise without departing from such principles.

List of reference numbers 1 steering wheel rim
2 segment
3 steering wheel core
4 foam
5 steering wheel cover
6 plates
7 switch

What is claimed is:

1. A device for shifting an automatic transmission for motor vehicles in combination with a steering wheel with a steering wheel rim, the device comprising:

a selector lever, which makes possible an automatic upshifting and downshifting of the transmission as a function of the speed of the vehicle and the speed of rotation of the engine in a first position; and an additional selector arrangement on the steering wheel, said additional selector arrangement being responsive to an application of force in a downshift direction to provide a manual downshifting and being responsive to an application of force in an upshift direction to provide a manual upshifting, said additional arrangement being integrated within the steering wheel rim as a segment covering a portion of a circumferential area of said steering wheel rim.

2. A device in accordance with claim 1, wherein said segment is mounted rotatably around a steering wheel rim longitudinal axis and having a button.

3. A device in accordance with claim 2, wherein said button has two locked positions for the downshifting, wherein the first locked position brings about a downshifting into the next lower gear and the second locked position brings about a downshifting into the lowest permissible gear at maximum speed.

4. A device in accordance with claim 1, wherein said segment of said steering wheel rim is elastically deformable around a longitudinal axis of said steering wheel rim and includes a switch that is actuatable by an applied rotating force.

5. A device in accordance with claim 4, where n said switch is a membrane switch.

6. A device in accordance with claim 4, wherein said switch is a pressure sensor switch.

7. A motor vehicle automatic transmission shifting arrangement, comprising:
  a steering wheel with an annular steering wheel rim having an annular rim longitudinal axis;
  a selector lever, which makes possible an automatic upshifting and downshifting of the transmission as a function of the speed of the vehicle and the speed of rotation of the engine in a first position; and
  an additional selector on the steering wheel, said additional selector being integrated within the steering wheel rim as a single region segment covering a portion of a circumferential area of said steering wheel rim, said single region segment being responsive to an application of force in a downshift direction to provide a manual downshifting and responsive to an application of force in an upshift direction to provide a manual upshifting, said downshift direction being substantially opposite to said upshift direction based on an application of a rotational force about a longitudinal extent of said single region segment.

8. An arrangement in accordance with claim 7, wherein said segment of said steering wheel rim is mounted rotatably around a longitudinal axis and said segment has a button.

9. An arrangement in accordance with claim 8, wherein said button has two actuation positions for the downshifting, wherein the first actuation position brings about a downshifting into the, next lower gear and the second actuation position brings about a downshifting into the lowest permissible gear at maximum speed.

10. An arrangement in accordance with claim 7, wherein said segment of said steering wheel rim is elastically deformable relative to said longitudinal axis of said steering wheel Tim and said switch that is actuatable by a rotating force.

11. An arrangement in accordance with claim 10, wherein said switch is a membrane switch.

12. An arrangement in accordance with claim 10, wherein said switch is a pressure sensor switch.

13. A motor vehicle automatic transmission shifting arrangement, comprising:
  a steering wheel with an annular steering wheel rim having an annular rim longitudinal axis; and
  a manual selector on the steering wheel, said manual selector being integrated within the steering, wheel rim as a single region segment covering a portion of a circumferential area of said steering wheel rim, said single region segment being responsive to an application of force in a downshift direction to provide a manual downshifting and responsive to an application of force in an upshift direction to provide a manual upshifting, said downshift direction being substantially opposite to said upshift direction based on an application of a rotational force about a longitudinal extent of said single region segment.

14. An arrangement in accordance with claim 13, wherein said segment of said steering wheel rim is mounted rotatably around a longitudinal axis and has a button.

15. An arrangement in accordance with claim 14, wherein said button has two actuation positions for the downshifting, wherein the first actuation position brings about a downshifting into the next lower gear and the second actuation position brings about a downshifting into the lowest permissible gear at maximum speed.

16. An arrangement in accordance with claim 13, wherein said segment of said steering wheel rim is elastically deformable with respect to said longitudinal axis of said steering wheel rim and includes a switch that is actuatable by a rotating force.

17. An arrangement in accordance with claim 16, wherein said switch is a membrane switch.

18. An arrangement in accordance with claim 16, wherein said switch is a pressure sensor switch.

* * * * *